(12) United States Patent  
Simpson

(10) Patent No.: US 7,108,138 B2  
(45) Date of Patent: Sep. 19, 2006

(54) MATERIAL CLASSIFIER

(76) Inventor: Peter Simpson, 72 West 31st Street, Hamilton, Ontario (CA) L9C 5E7

( * ) Notice: Subject to any disclaimer, the term of this patent is extended or adjusted under 35 U.S.C. 154(b) by 0 days.

(21) Appl. No.: 10/898,325

(22) Filed: Jul. 26, 2004

(65) Prior Publication Data

US 2005/0242007 A1    Nov. 3, 2005

Related U.S. Application Data

(63) Continuation-in-part of application No. 10/834,221, filed on Apr. 29, 2004, now abandoned.

(51) Int. Cl.
  *B07B 7/00* (2006.01)
  *B01D 45/00* (2006.01)

(52) U.S. Cl. .................... 209/720; 209/154; 55/431; 55/459.1; 55/459.2

(58) Field of Classification Search ............... 209/710, 209/711, 713, 714, 715, 720, 721, 154, 138, 209/139.1, 139.2; 55/431 X, 459.1 X, 459.2 X; B07B 7/00; B01D 45/00

See application file for complete search history.

(56) References Cited

U.S. PATENT DOCUMENTS

| 1,457,110 | A | * | 5/1923 | Gay | ................. 209/139.1 |
|---|---|---|---|---|---|
| 2,153,026 | A | * | 4/1939 | Ringius | ................. 55/459.1 |
| 3,423,034 | A | * | 1/1969 | Hippert | ................. 241/51 |
| 3,615,008 | A | * | 10/1971 | Alpha | ................. 209/139.2 |
| 3,981,454 | A |  | 9/1976 | Williams |  |
| 4,526,678 | A | * | 7/1985 | Myhren et al. | ................. 209/2 |
| 4,728,047 | A |  | 3/1988 | Shagarova et al. |  |
| 5,341,935 | A | * | 8/1994 | Djerf et al. | ................. 209/3 |
| 5,762,666 | A | * | 6/1998 | Amrein et al. | ................. 55/425 |
| 5,958,094 | A |  | 9/1999 | Schwamborn et al. |  |

FOREIGN PATENT DOCUMENTS

SE    WO 03/033158 A1 *  4/2003

* cited by examiner

*Primary Examiner*—Joseph Rodriguez

(57) ABSTRACT

A material classifier includes a cyclone including a cyclone inlet, a cyclone outlet, a blower and a blower discharge; an air diffuser connected at a diffuser inlet to the cyclone outlet and at a diffuser outlet to an air lock such that the cyclone and air diffuser are in fluid communication; wherein the diffuser including a central cylindrical portion including an air inlet for admitting controlled amounts of diffuser air around substantially the entire cylinder outer periphery of the central cylindrical portion, wherein the material classifier separating fine particles from coarse particles and discharging the fine particles together with air out the blower discharge, and discharging the coarse particles through the air lock, such that varying the amount of diffuser air one can control the size of the fine particles being separated from the coarse particles.

23 Claims, 10 Drawing Sheets

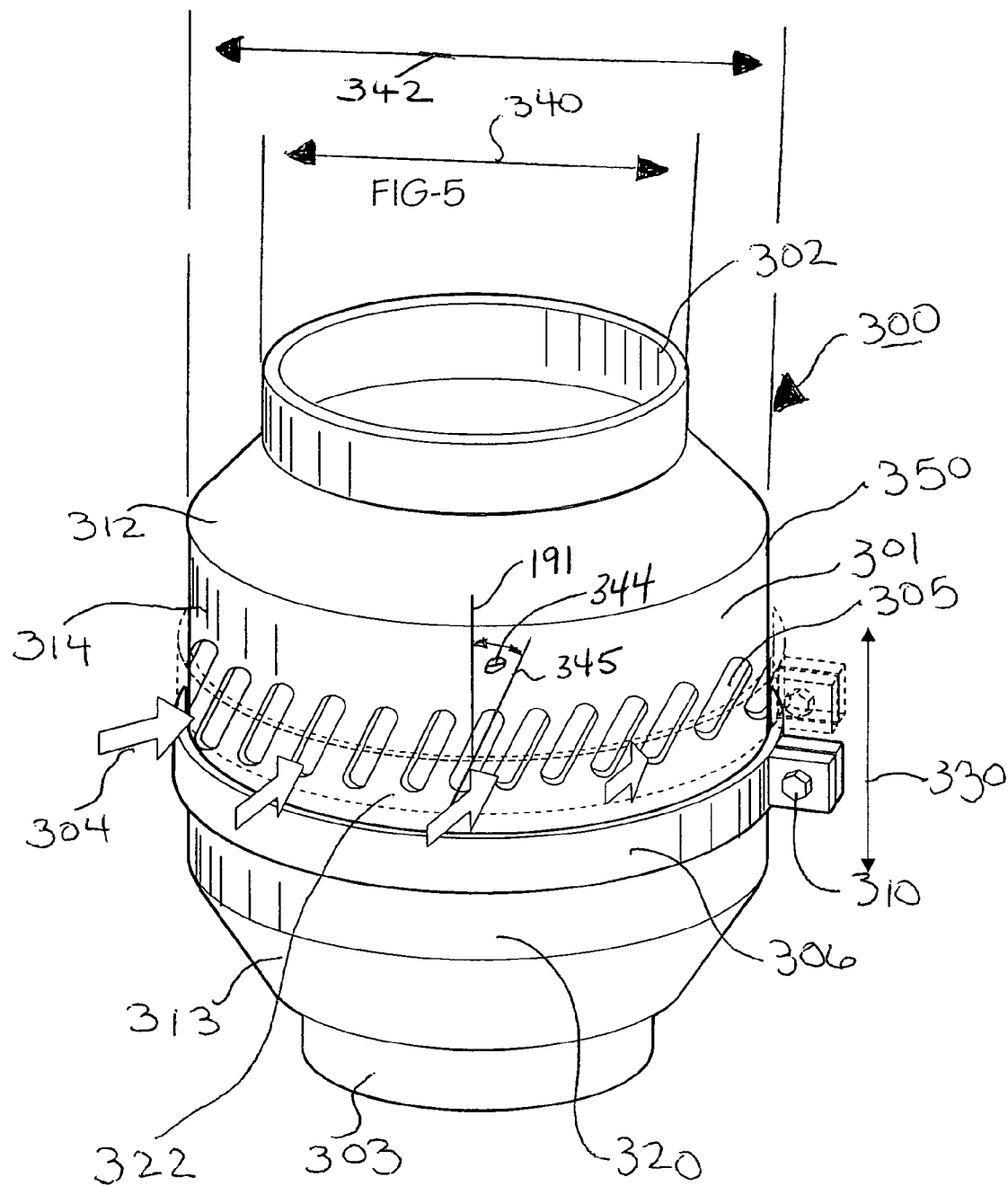

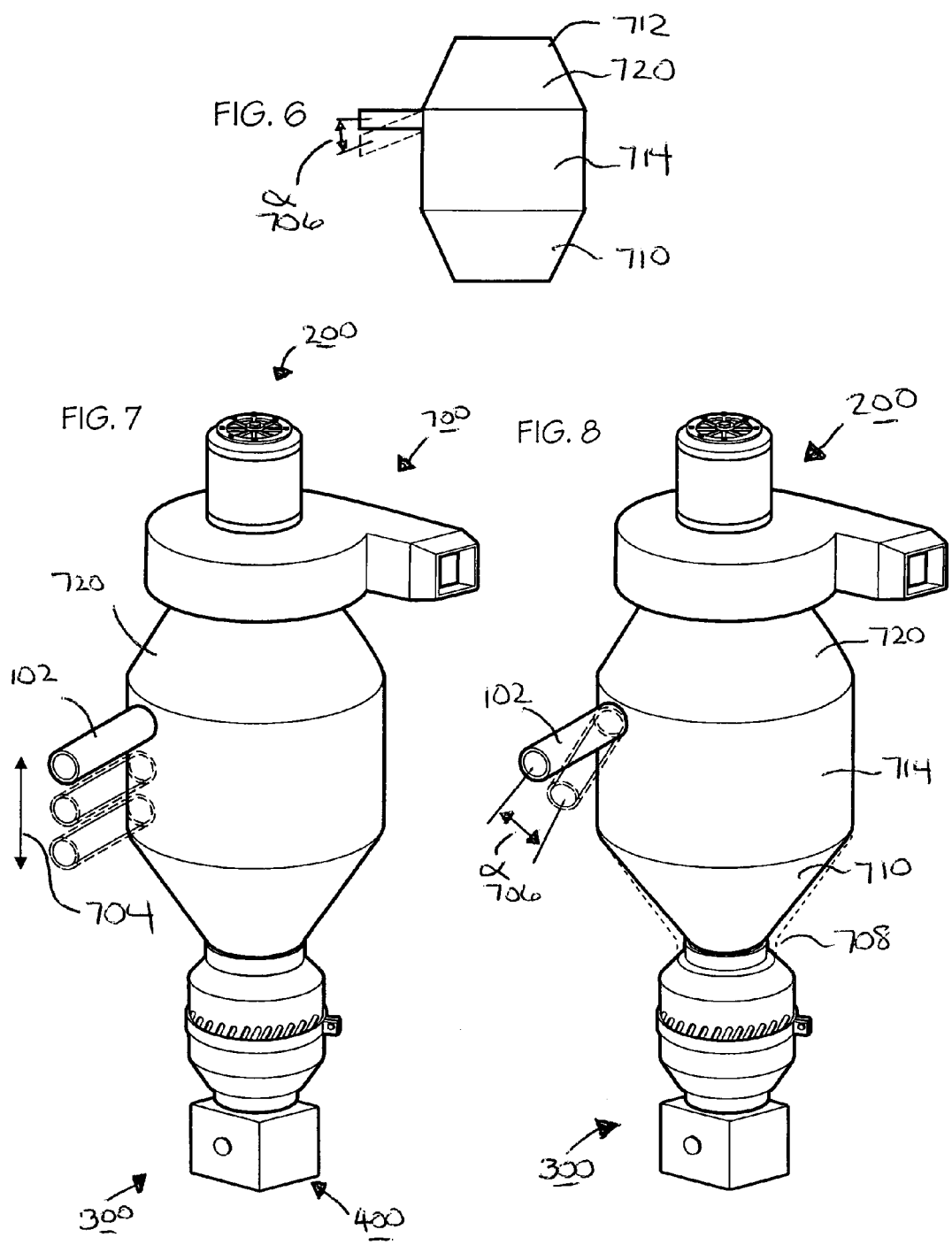

MATERIAL CLASSIFIER

This application is a continuation in part of previously filed U.S. application Ser. No. 10/834,221 which was filed on Apr. 29, 2004 now abandoned.

FIELD OF THE INVENTION

The present invention relates to material classification systems and in particular relates to material classifier using a cyclone.

BACKGROUND OF THE INVENTION

In order to transport granular materials they are often entrained in air or some gas. By fluidizing granular material in air, one is capable of transporting the granular materials through pipes, long distances to desired locations. Once the material has reached its desired location, the material being transported must be separated from the air which is usually accomplished with a cyclone. Therefore in most material conveying systems using air fluidization or entraining granular particles within air, the final air material separation is often accomplished with a cyclone.

Furthermore, there is often the requirement that the granular materials being transported, further needs to be classified into different sizes. The most fundamental classification that usually is required is separation of coarser material from finer material for subsequent operations. There are a number of existing devices which independently of the cyclone have the capability of classifying materials into different sizes. It would be desirable, however to use the cyclone in addition to its air separating ability to also be able to classify the materials into different sizes. This would eliminate an intermediate step and the equipment associated with classifying granular materials into various sizes.

There have been attempts at accomplishing this within the cyclone, in for example prior art in International Application WO 03/033158 A1, titled Dust Separator, filed by Rapid Granulator AB on Oct. 19, 2001, wherein they describe a cyclone which is used for the separation of dust from granular material, using a separator chamber mounted on the lower side of a cyclone. Particles dropping out of the bottom of the cyclone pass into a separator chamber and impinge upon a deflector device, wherein via this impact any dust upon the particles settling out of the bottom of the cyclone is dislodged and carried upward through a "inner wall" of the cyclone. Further, the art teaches plates disposed within the inner walls, whose purpose is to prevent or reduce rotation of the flow which takes place with the major direction upwards within the "inner wall" of the cyclone. An air inlet is located below the separator chamber. A downwardly angled portion of the inlet conduit, introduces air and is controlled by a regulator valve. The art taught in this patent is directed towards removal of dust which is adhered to larger granular particles. The apparatus intends to dislodge the dust from the larger granular materials by impinging the larger granular materials upon the deflector devices within a separation chamber. This unit is limited to the collection and removal of extremely fine dust particles from granular materials.

There is however, a need to be able to use a cyclone as a material classifier to be able to classify granular materials into coarse and fine in addition to having the capability of dust removal as indicated in the prior art PCT Application WO 03/033158 A1.

SUMMARY OF THE INVENTION

The present invention a material classifier includes:
a) a cyclone including a cyclone inlet, a cyclone outlet, a blower and a blower discharge;
b) an air diffuser connected at a diffuser inlet to said cyclone outlet and at a diffuser outlet to an air lock such that said cyclone and air diffuser are in fluid communication;
c) wherein said diffuser including a central cylindrical portion including an air inlet means for admitting controlled amounts of diffuser air around substantially the entire cylinder outer periphery of said central cylindrical portion, wherein said material classifier separating fine particles from coarse particles and discharging said fine particles together with air out said blower discharge, and discharging said coarse particles through said air lock, such that increasing the amount of diffuser air increases the size of the fine particles being separated from the coarse particles.

Preferably wherein said diffuser air is admitted into said cyclone in such a manner as to enhance and reinforce the formation of a strong interior vortex.

Preferably wherein said air inlet means including numerous air inlet apertures spaced around said cylinder outer periphery for admitting diffuser air Preferably wherein said air inlet means including numerous air slots spaced around said cylinder outer periphery for admitting diffuser air.

Preferably wherein said air slots extending along a longitudinal axis, and said slots oriented at an angle theta measured between said longitudinal axis and vertical such that when diffuser air is admitted through said angled slots said air flow supporting development of an interior cyclone in said cyclone.

Preferably wherein said angle theta between 10 and 80 degrees.

Preferably wherein said slots are so oriented so as to enhance and reinforce a formation of a strong interior vortex.

Preferably wherein said air inlet means further including a control means for adjustably controlling the amount of diffuser air being admitted through said air inlet means and into said air diffuser.

Preferably wherein said control means including an annular adjustable band extending and clamping around the cylinder outer periphery for selectively covering off all or some of the slot area.

Preferably wherein said control means including a barometric damper for adjusting the amount of diffuser air depending upon the material through put of the cyclone.

Preferably wherein said central cylindrical portion being larger in diameter than a cyclone outlet diameter.

Preferably wherein said central cylindrical portion having a diameter at least 1.2 times that of the cyclone outlet diameter.

Preferably wherein said cyclone being a mid efficiency cyclone having a air inlet velocity of no more than 3000 feet per minute.

Preferably wherein said cyclone dimensioned and adapted to promote formation of an exterior downwardly spiralling vortex and an up draft interior upwardly spiralling vortex.

Preferably wherein said cyclone further including a stand pipe dimensioned to aid and enhance the development of a strong updraft interior vortex.

Preferably wherein said air diffuser including an upper tapered portion for the transition between the diffuser inlet and the central cylindrical portion.

Preferably wherein said central cylindrical portion being a hollow body and a vertical length greater than the diameter of the cyclone outlet.

Preferably wherein the entrained particles being selected from the list including granulate, pellets, fibres, flakes, beans, plastic, metal, and paper.

BRIEF DESCRIPTION OF THE DRAWINGS

The invention will now be described by way of example with reference to the following drawings in which:

FIG. 5 is an upright schematic perspective view of the air diffuser portion part of the material classifier.

FIG. 6 is a side plan elevational view of an alternate embodiment of the body portion of a material classifier shown in FIGS. 6, 8 and 9.

FIG. 7 is a upright schematic perspective view of an alternate embodiment of a material classifier showing various inlet heights.

FIG. 8 is an upright schematic perspective view of the alternate embodiment of the material classifier shown in FIG. 7, showing by way of example two different inlet angles, alpha and two different bottom outlet diameters.

DETAILED DESCRIPTION OF THE PREFERRED EMBODIMENT

Figure 4:
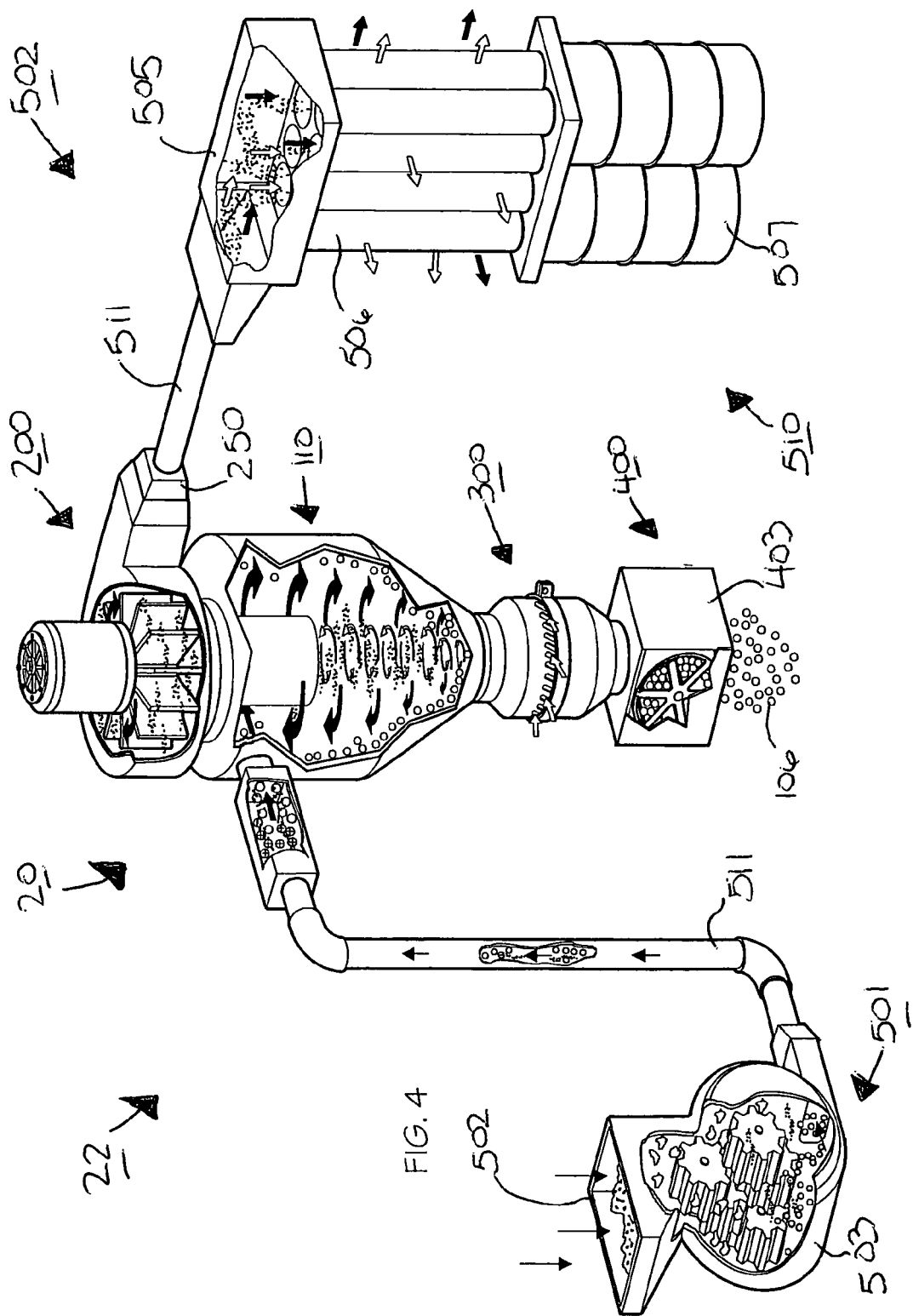
FIG. 4 is a schematic perspective partial cut away view of a regrind system showing the present invention the material classifier.

The present invention a material classifier shown generally as 20 is shown in FIG. 4 deployed together with other equipment making up a regrind system shown generally as 22. Regrind system 22 takes plastic components and/or plastic parts or rejected plastic parts and feeds them through a grinder shown generally as 501 which produces granular material containing both coarser particles, finer particles and of coarse also some dust. All of this granular material is conveyed to material classifier 20, wherein the coarse granular particles 106 are separated from the finer granular particles 107 as well as dust which may be entrained, such that coarse particles 106 are discharged from air lock housing 401 and finer granular materials as well as dust together with air is discharged from blower discharge 250 to bag house 502.

Figure 1:
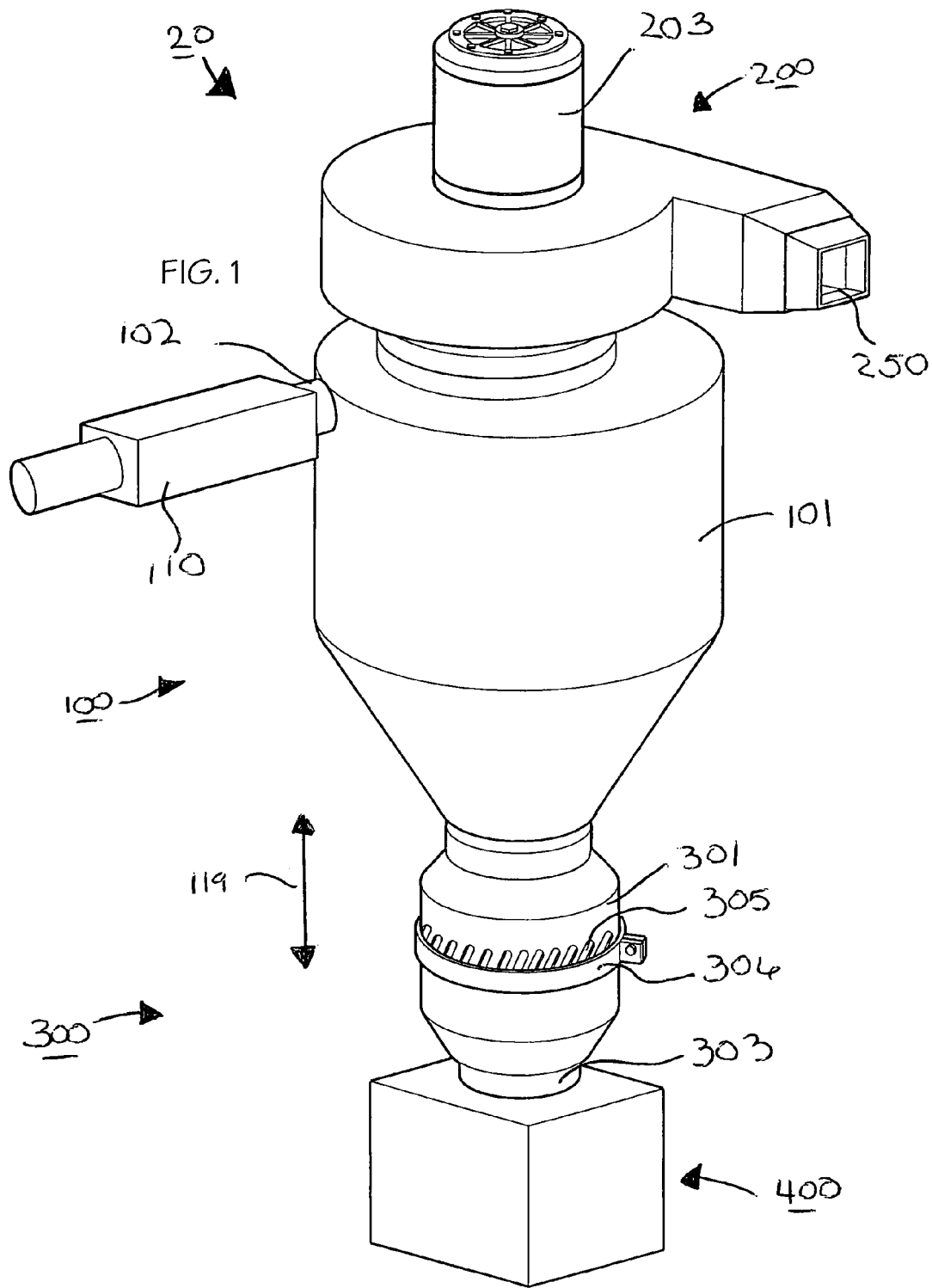
FIG. 1 is an upright schematic perspective view of the present invention a material classifier.
Figure 2:
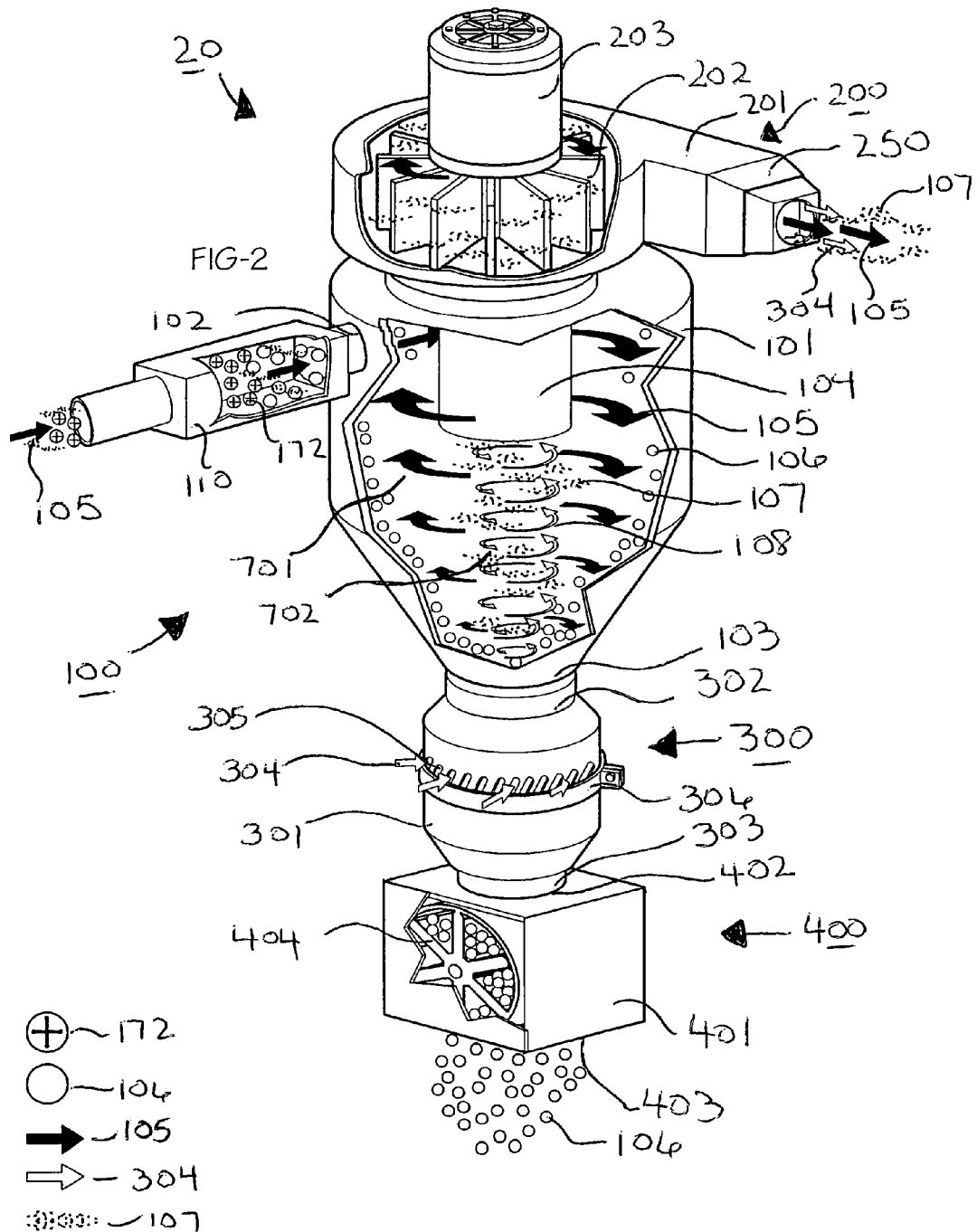
FIG. 2 is an upright schematic partial cut-away perspective view of the present invention a material classifier.

The present invention, material classifier shown generally as 20 as shown in FIGS. 1 and 2 and includes the following major components namely cyclone 100, blower 200, air diffuser 300 and air lock 400. Cyclone 100 includes cyclone housing 101, tangential cyclone inlet 102, cyclone outlet 103, internal stand pipe 104 and blower air 105 shown generally as dark arrows. Note that blower air 105 shown as dark arrows will have entrained therein depending upon the location within the process, coarse particles 106, fine particles 107, diffuser air 304 as well as dust. Note that diffuser air flow is generally shown as light or white arrows 108 and diffuser air flow 108 will have entrained in it, depending upon the location within the device, fine particles 107 as well as dust. Cyclone 100 is the type known in the art and normally utilized for separating air from particles entrained or fluidized in the air.

Blower 200 includes the following major components, blower housing 201 having mounted therein a fan 202 driven by a motor 203, having a blower discharge 250, wherein blower 200 draws in blower air 105 through cyclone inlet 102 and further through stand pipe 104 and out through blower discharge 250.

Air diffuser 300 includes a substantially hollow cylindrically shaped diffuser housing 301, diffuser inlet 302, diffuser outlet 303, diffuser air 304, shown generally as light or white arrows 108. Diffuser air 108 is introduced into air diffuser 300 via air slots 305 which can be opened and closed with adjustable band 302 having an adjusting bolt 310, such that adjustable band 306 can be moved along vertical direction 330. FIG. 5 shows adjustable band 306 in the fully opened position 320 in solid lines and the partially closed position 322 in dashed lines. Diffuser housing 301 includes an upper tapered portion 312, a central cylindrical portion 314, a lower tapered portion 314, wherein diffuser inlet 302 has a inlet diameter 340 which is the same as the cyclone outlet diameter and wherein central cylindrical portion 314 has a cylindrical diameter 342.

Material classifier 20 further includes some type of air lock 400 shown in these diagrams buy way of example only as a rotary air lock 400, including an air lock housing 401, an air lock inlet 402, a discharge 402 and a rotor 404. Kindly note that air lock 400 can be any of the types known in the art, not necessarily a rotary air lock as depicted here as long as the air lock 400 is able to separate solid materials from air.

Figure 3:
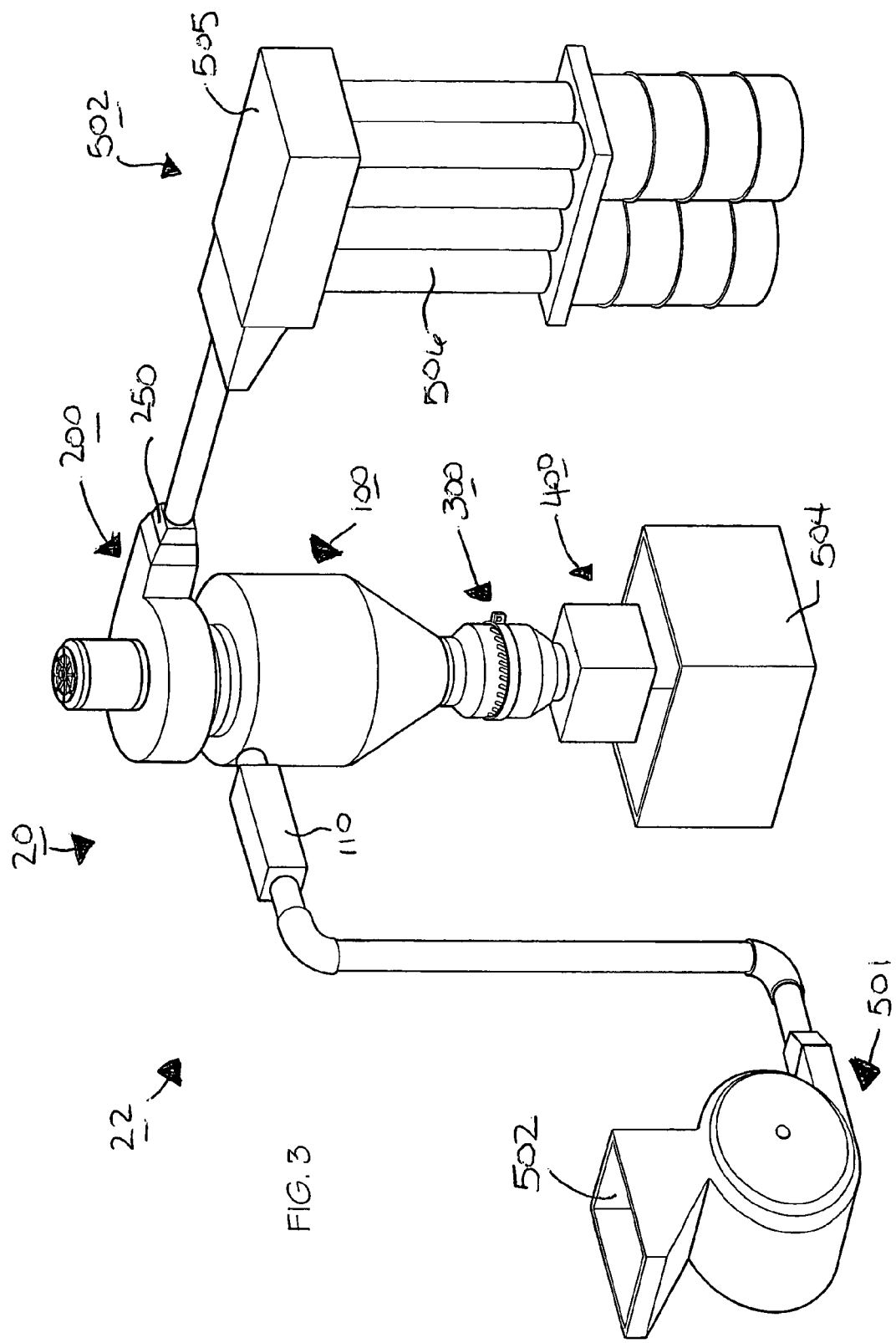
FIG. 3 is a schematic perspective view of a regrind system including the present invention a material classifier.

The regrind system shown generally as 22 in FIGS. 3 and 4, includes a grinder 501 having a grinder housing 503, and a raw material inlet 502 further including piping 511 for transportation of granular material to the material classifier 20. Prior to the fluidized material entering cyclone 100, it is preferably passed through an anti-static system 110, wherein charged particles 172 enter into anti-static system 110 are neutralized such that uncharged coarse particles 106 leave anti-static system 110. Anti-static system 110 will neutralize both coarse and fine particles as well as dust particles, even though this is not depicted in the drawings. Material classifier 20 separates coarse particles which exit through the bottom of discharge 403 of air lock 400, wherein fine particles 107 exit at blower discharge 250 via piping 511 to a bag house 502 which includes a plenum 505, air filters 506 and fine containers 507.

In Use

Granular material is received into cyclone 100 through cyclone inlet 102 which is positioned in such a manner to set up cyclonic motion within cyclone housing 101 as depicted schematically with the dark black arrows which are denoted as blower air 105. Blower 200 having fan 202 driven by fan motor 203, creates a vacuum or suction on cyclone inlet end 102 and draws granular material in through cyclone inlet 102. Granular material normally includes coarse particles 106, fine particles 107, and dust particles not shown as well as blower air 105 all mixed together at cyclone inlet 102. Cyclone inlet 102 is normally positioned above a vertical stand pipe 104 centrally and coaxially mounted within cyclone housing 101. This cyclone geometry well known in the art creates a circular flow around the exterior portion of cyclone housing 101 as depicted by the dark arrows of blower air 105 and the heavier coarse particles 106 through centrifugal force are swept to the exterior periphery of cyclone housing 101 and make their way downwardly in vertical direction 191 towards cyclone outlet 103. Blower air 105 drawn into fan 202 of blower 200 enters stand pipe 104 and up and through fan 202 and out blower discharge 250.

It is believed that an up draft and or a counter rotating vortex is created vertically below stand pipe 104 which typically provides for the removal of blower air 105 through blower 200 and out through blower discharge 250.

Therefore there is an exterior spirally downwardly rotating vortex 701 with heavier coarser particles 106 entrained therein and moving vertically downwardly along vertical direction 191 and there is an interior updraft or spirally upwardly counter rotating vortex 702 developed proximate the central portion of cyclone housing 101 and in this manner blower air 105 is removed from cyclone housing 101 at times together with dust out of blower discharge 250.

Prior art International Application WO 03/033158 A1 adds an additional separator chamber 18 below cyclone 100 which has mounted therein a deflector device 19, wherein coarser particles impinge upon the deflector device, such that additional dust is dislodged from coarser particles and by additionally allowing air to enter below a separator chamber, this dust is then carried out with the air discharge rather than through the air lock.

In the present invention as coarse particles 106, together with fine particles 107 as well as dust, makes its way downwardly in cyclone 100 towards cyclone outlet 103 and into air diffuser 300, particles of all sizes meet with diffuser air 304 which is allowed to enter through air slots 305 which are defined around the entire cylinder outer periphery 350 of central cylindrical portion 314 of diffuser housing 301.

Diffuser air 304 entering through air slots 305 defined around the entire cylinder out periphery 350, fluidizes or entrains, fine particles by supporting and enlarging the up draft interior vortex 702 and effectively strengthens the upward force of interior vortex 702 and diffuser air 304 rising upwardly into stand pipe 104 creates a strong upward draft such that by controlling the amount of diffuser air 304, one controls the strength and velocity of air within interior vortex 702 and in this manner, one can control the size of particles which are fluidized by interior vortex 702 and which eventually make their way through blower 200 and out through blower discharge 250.

Experimentally, it has been found that it is important to support the existing up draft interior vortex 702 as well as the exterior vortex 701 through the design of the inlet of diffuser air 304 into cyclone 100.

Unlike the prior art as described in WO 03/033158 A1 which in fact indicates that they are using plates within a the stand pipe for the purpose of preventing or reducing rotation of flow which takes place with the major direction upwards inside the inner walls. The present invention utilizes the existing upwards flow within cyclone by controllably strengthening and enhancing the up draft flow within the interior vortex 702 in order to selectively fluidize particles of pre determined size.

As a result, it has been found that by angling air slots 305 at an angle theta 344 measured between a longitudinal axis 345 and the vertical direction 191, one is able to enhance and encourage the up draft interior vortex 702 by placing the air slots 305 around cylinder outer periphery 350 in an angled relationship having an angle theta 344 as shown in FIG. 5. Adjustable band 306 having an adjustment bolt 310 is strapped around central cylindrical portion 314 of air diffuser 300 and can be adjusted by loosening off bolt 310 to a fully opened position as shown in 320 in FIG. 5 or a partially closed position 322 as shown as dashed lines in FIG. 5 or in fact it can fully close off air slots 305 by placing adjustable band 306 entirely covering air slots 305.

Through trial and error and experimentation it has been found that it is important that central cylindrical portion 314 have a cylinder diameter 342 larger than inlet diameter 340 which is basically the same diameter as cyclone outlet 103. It has been found that in order to enhance and aid the interior vortex 702 development, one needs to introduce diffuser air 304 at a cylinder diameter 342 which is larger than the cyclone outlet diameter 103. In addition, it has been found very important that air be introduced around the entire periphery of cylinder outlet 350, rather than at just a single point, once again in order to aid the development and strength of interior vortex 702 which is rotating counter clock wise and rising upwardly within cyclone housing 101.

In practice one has been able to control the classifier such that the material size exiting out of blower discharge 250 can be carefully controlled by allowing more or less diffuser air 304 through air slots 305 of air diffuser 300. The heaviest particles will immediately tend to the outer diameter of cyclone housing 101 and will drop through air diffuser 300 undisturbed and into air lock 400.

However by introducing more diffuser air 304 through air slots 305, the interior vortex 702 becomes stronger and more fully developed and will fluidize and carry upwardly larger and larger granules of particles up through stand pipe 104 and out through blower discharge 250, such that one can select the size of particles into at least two distinct sizes, namely coarser particles 106 and fine particles 107, in addition to dust removal.

A person skilled in the art will note that cyclone 100 in any event removes dust particles not shown in the attached diagrams and the prior art in International Application WO 03/033158 A1 has indicated a method or a means of adding or enhancing dust removal through a conventional cyclone 100.

In addition to dust removal, material classifier 20 has the capability of selectively removing heavier particles and in fact can classify incoming particles into at least two classifications namely coarse particles 106 which are discharged from discharge 402 of air lock 400 and fine particles 107 which are discharged from blower discharge 250. The fine particle size can be controllably selected by adjusting the amount of diffuser air 304.

Material classifier 20 appears to be most effective when using a mid-efficiency cyclone 100 rather than a high efficiency cyclone. A mid efficiency cyclone generally has an air velocity of less than 3000 feet/min. High efficiency cyclones tend to be smaller in diameter and longer in length and have a strong exterior vortex 701 and it is the inventors theory that the interior vortex 702 tends to be extremely weak and therefore it is difficult to support and/or enhance the interior vortex 702 development with the addition of diffuser air 304 through air slots 305. In any event, through trial and error and experimentation, it has been found that a larger diameter cyclone 100 known in the industry as a mid efficiency cyclone, appears to develop a very strong interior vortex 702 which can be enhanced and utilized with the introduction of diffuser air 304 through air slots 305.

Material classifier 20 is shown in a typical installation of a regrind system 22 as depicted schematically in FIGS. 3 and 4.

By way of example only and without limitation, a plastic regrind system takes existing plastic components or scrap from injection moulding machines or blow moulding machines and regrinds this plastic for later reuse. The plastic is introduced into grinder 501 through raw material inlet 502 and via piping 511 is conveyed in an air fluidized manner to material classifier 20, wherein both coarse particles 106 and fine particles 107 enter material classifier 20 along with dust of coarse, and wherein through the cyclonic action of cyclone 100, the larger particles fall quickly to the cyclone outlet 103 and out through air diffuser 300 and into air lock 400, where they are dropped into material container 504. Depending upon the amount of diffuser air 304 which one selects to enter through air slots 305, the lighter, smaller granular particles as well as dust is carried upwardly with interior vortex 702, up through blower 200 and out through blower discharge 250. Therefore, larger particles of a certain size are discharged through air lock 400 and smaller particles of a certain size are discharged through blower discharge 250.

In order to separate blower air 105 from fine particles 107 and dust which also may be entrained, a bag house 502 is employed, wherein the air and particles discharged from blower discharge 250 pass through plenum 505 and drop down through air filters 506 wherein air is discharged and fine granular material is collected in fines containers 507.

In this manner a person skilled in the art will note that various granular materials can be classified using material classifier 20 including plastic materials, grains, sands, coffee, wood chips, rubber granular materials, fibre granular materials, plastics from metal, jute from wire, filaments and many other granular type materials too numerous to list here.

Further it has been found that by using a barometric damper (not shown in the drawings) to control the amount of diffuser air 304 one can compensate for through put variations such as material surges or variations in material through put rates. The barometric damper would have an upstream sensor placed prior to cyclone inlet 102 which would adjust diffuser air 304 amounts according to material through put.

Description of Alternate Embodiment

An alternate embodiment of the material classifier is shown in FIGS. 6, 7, 8 and 9 and is shown generally as material classifier 700 which operates in an analogous fashion as material classifier 20 with the following modifications and improvements to the cyclone.

Material classifier 700 includes a conical top 720 having a top diameter 712, a cylindrical section 714 and a conical bottom section 710. It further includes cyclone inlet 102 which can positioned at different inlet height 704 and/or different inlet angles alpha 706. In addition, conical bottom 710 may have a differing bottom outlet diameter 708 as shown particularly in FIG. 8 in dashed lines being the larger bottom outlet diameter 708 and the solid lines being the smaller bottom outlet diameter 708.

Figure 9:
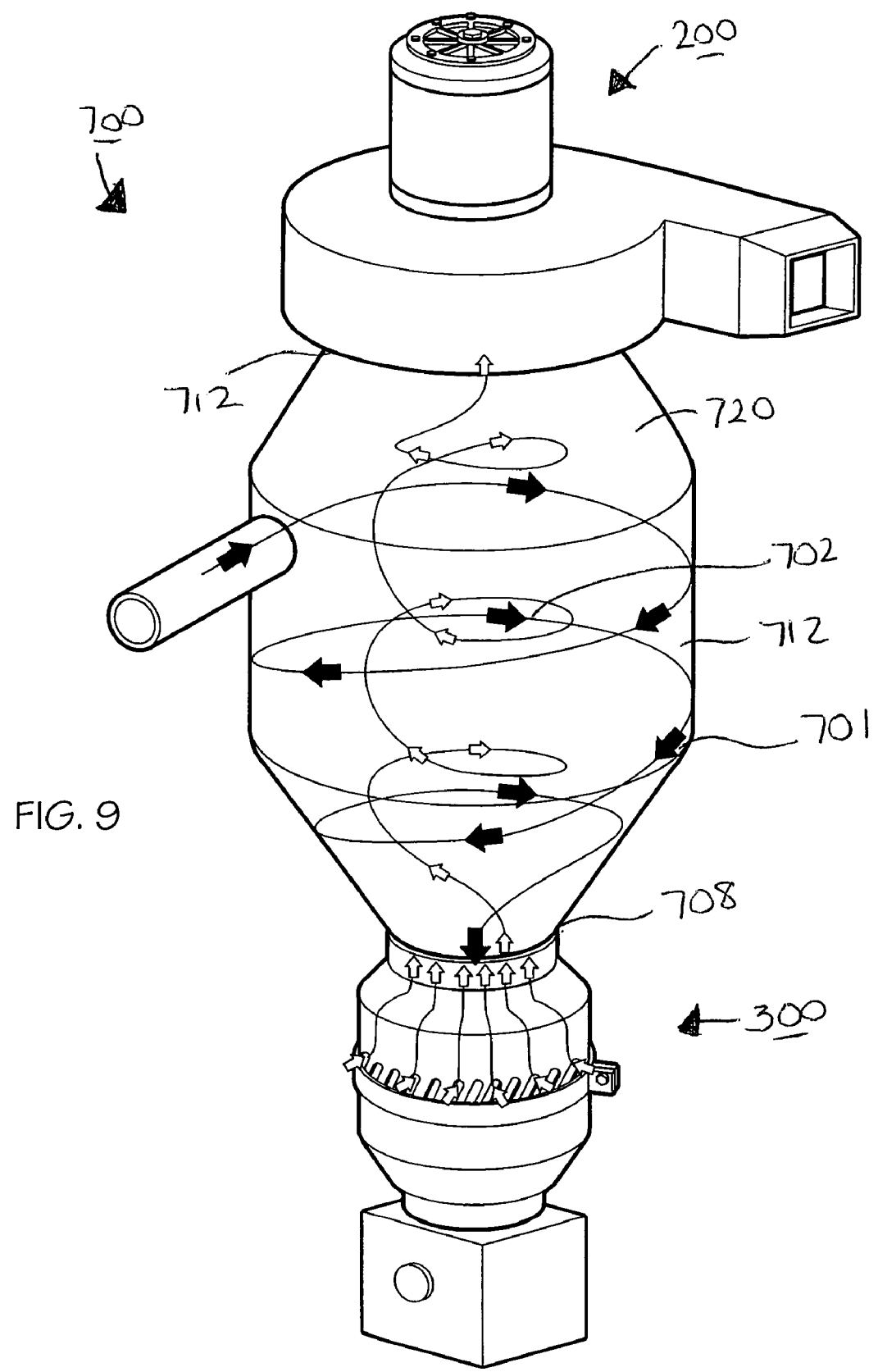
FIG. 9 is an upright schematic transparent view of an alternate embodiment of the material classifier with a conical top showing the interior vortex and the exterior vortex.

Referring now to FIG. 9 which shows schematically the development of the interior vortex 702 which is rising upwardly and development of the exterior or vortex 701 which is moving downwardly. The modifications to material classifier 700 will now be explained in regard to optimizing the development and strength of interior vortex 702 which carries out fines through blower discharge 250.

It has been found by trial and error that in order to encourage development of the updraft in interior vortex 702 and more efficient separation of coarse particles 106 from fine particles 107, a number of modifications to the cyclone have been shown to help develop a stronger interior vortex 702. In particular the inlet height 704 shown in FIG. 7 will aid in the development of interior vortex 702 as well as the inlet angle alpha 706 as shown in FIG. 8 and FIG. 6 and as well by adding a conical top section 720 on top of cylindrical section 714, one also is able to enhance and aid the development of a strong interior vortex 702.

The inventor has also found that by having a smaller bottom outlet diameter 708 as shown in FIG. 8, one can also increase the updraft or the strength of interior vortex 702 within material classifier 700.

By optimizing inlet height 704, inlet angle alpha 706, bottom outlet diameter 708 as well as by the addition of a conical top section 720, one can customize material classifier 700 to separate the coarse particles 106 from fine particles 107.

Description of Alternate Embodiment

Figure 10:
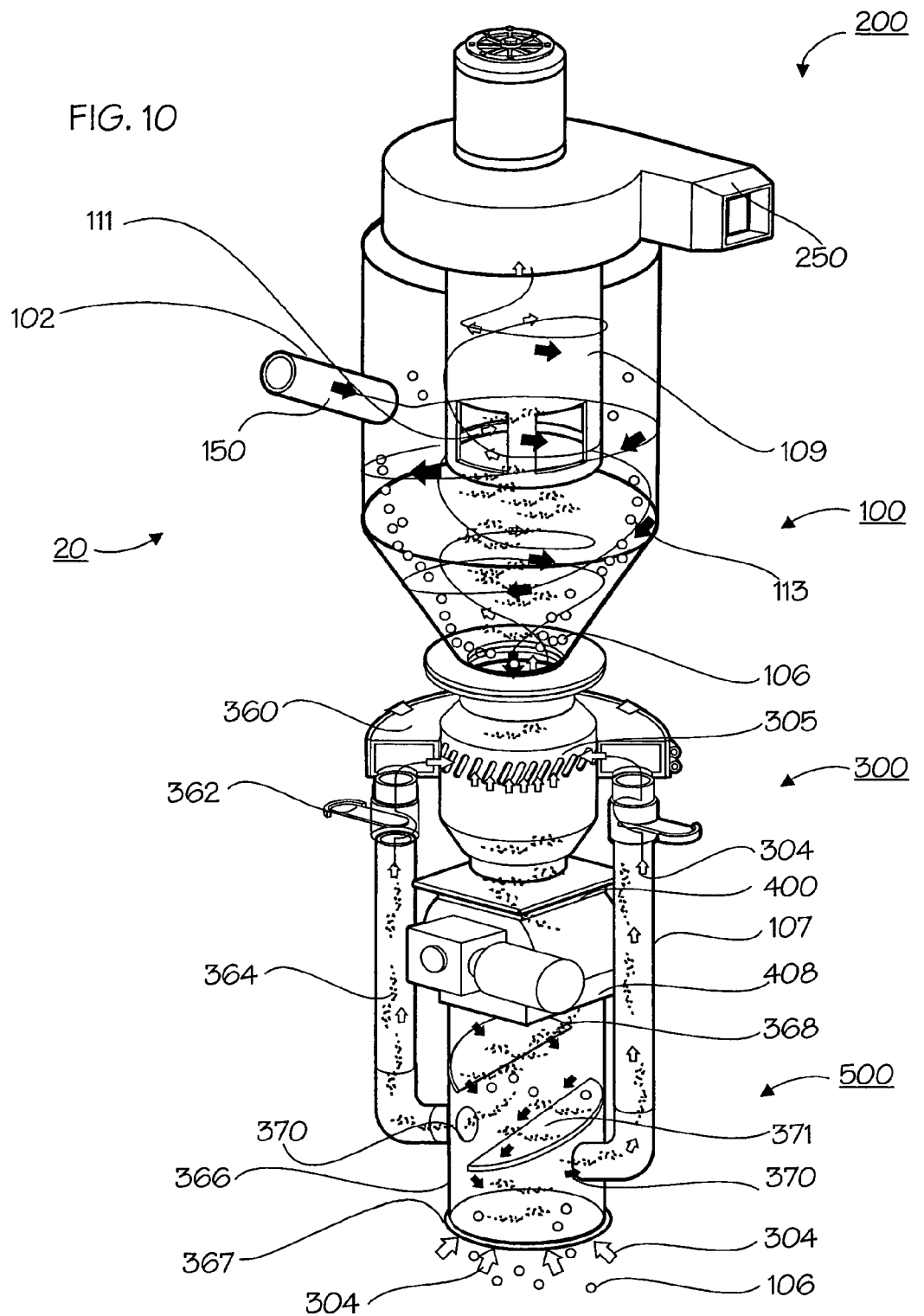
FIG. 10 is an upright schematic perspective view of an alternate embodiment of the present invention a material classifier.
Figure 11:
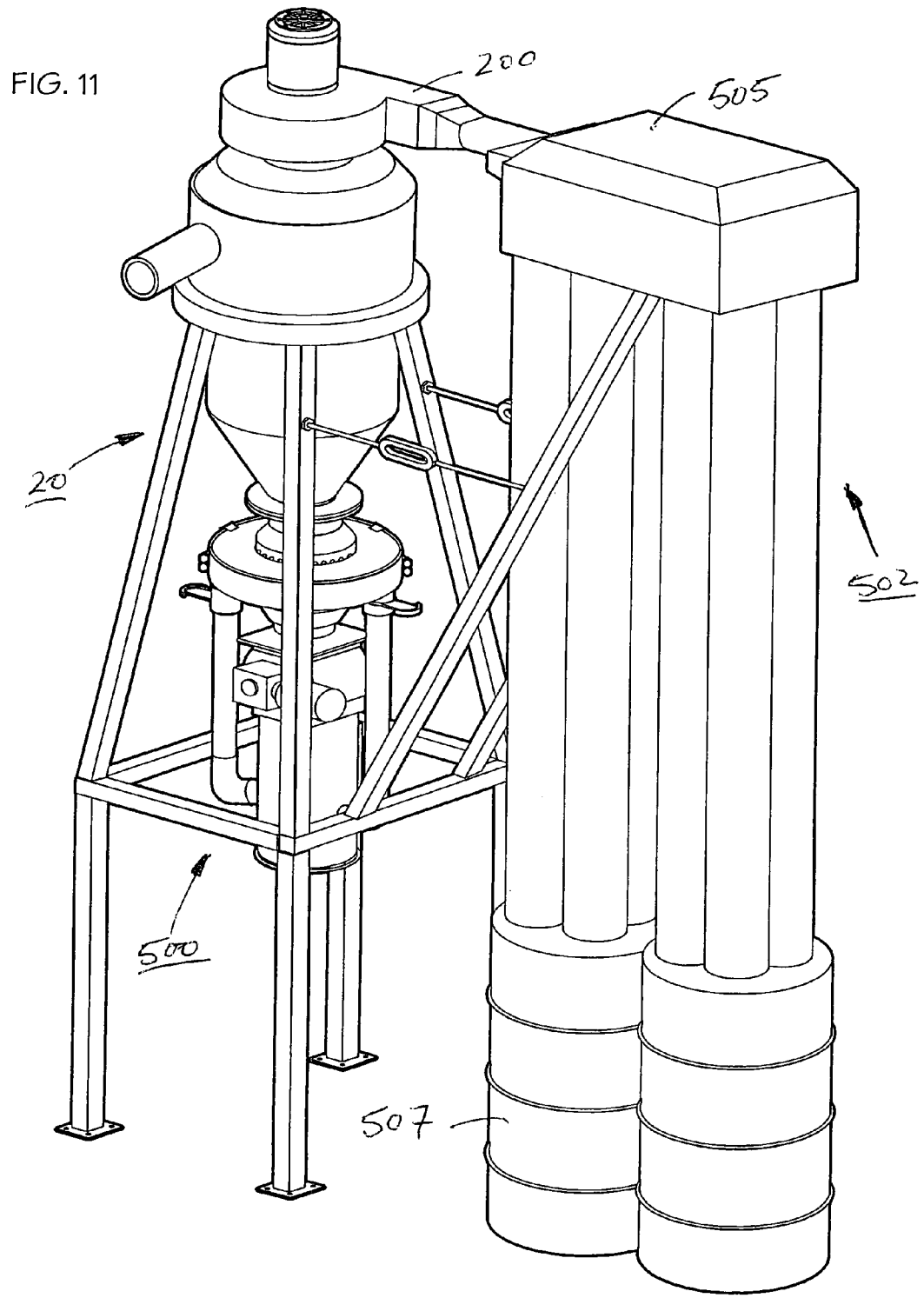
FIG. 11 is an upright schematic perspective view of an alternate embodiment of the present invention a material classifier together with a fines collection system.

Referring now to FIGS. 10 and 11, the presently preferred embodiment of material classifier 20 includes cyclone 100, blower 200, air diffuser 300, air lock 400 and secondary cleaning unit 500. In order to more effectively be able to separate coarse particles 106 from fine particles 107, in practise it has been found that preferably inlet 102 be angled downwardly at an angle between 5 and 15 degrees shown in FIG. 10. Furthermore, previous embodiment of stand pipe 104 is modified to the now shown modified stand pipe 109 which includes stand pipe inlets 111 which are arranged around the bottom end of modified stand pipe 109 and including a closed off bottom 113. Previous stand pipe 104 simply had an open bottom which with modified stand pipe 109 has been closed off to provide for a closed off bottom 113 and the inlet into modified stand pipe 109 is through stand pipe inlets 111 which are openings arranged near the bottom end of modified stand pipe 109 as shown as stand pipe inlets 111 in FIG. 10.

Further additions to air diffuser 300 includes secondary cleaning unit 500 which includes a diffuser plenum 360 which covers over all of the air slots 305 which are around the periphery of air diffuser 300, such that air moving through air slots 305 is communicated through diffuser plenum 360.

In addition, to diffuser plenum 360, gate valve 362 is included in diffuser air pipes 364 which are in communication with discharge pipe 366 through secondary inlet 370.

A person skilled in the art will note that secondary cleaning unit 500 is situated below or at exit side 408 of air lock 400 which preferably is a rotary air lock, however other air locks may also be used in its place. Secondary cleaning unit 500 includes an upper deflector plate 368, a lower deflector plate 371, mounted within discharge pipe 366. The upper and lower deflector plates 368 and 371 are arranged to create a cascading action of materials as they fall through discharge pipe 366.

In use diffuser air 304 enters through discharge pipe bottom 367 of discharge pipe 366 and is drawn into discharge pipe 366 and up through secondary inlets 370 of diffuser air pipe.364 and up past gate valve 362 and into diffuser plenum 360 and eventually through air slots 305 of air diffuser 300. The function of air diffuser 300 is as previously described in the above description. In addition to the function of air diffuser 300, which is to aid in the removal of fine particles 107, in addition, even finer particles or ultra fine particles can be removed with the addition of secondary cleaning unit 500 and ancillary equipment thereto. The amount of diffuser air 304 entering into air diffuser 300 is controlled by gate valves 362 and this also allows one to control the size of the fine particles 107 which are separated from coarse particles 106 by opening and closing gate valves 362.

Initially, fine particles 107 are removed through diffuser air 304 entering through air slots 305 of air diffuser 300 and carried up through modified stand pipe 109 of cyclone 100 and discharged out of blower discharge 250.

By additionally mounting a discharge pipe 366 as shown in FIG. 10, on the exit side 408 below air lock 400, both coarse particles 106 and fine particles 107 which at the exit side 408 are very fine particles are discharged onto upper deflector plate 368 and cascade onto lower deflector plate 371 and in the process pass by secondary inlets 370 which because of the negative pressure or suction created by cyclone 100, diffuser air 304 is drawn into secondary inlet 370 and in the process, very fine particles 107 are carried with diffuser air 304 up through diffuser air pipe 364 into diffuser plenum 360 and up through air diffuser 300 and eventually out through modified stand pipe 109 and blower discharge 250.

In practise the inventor has found by the addition of secondary cleaning unit 500, very fine particles that initially made it past air diffuser 300 are collected in discharge pipe 366 and carried up through diffuser air pipes 364 and out through cyclone 100. The addition of gate valve 362 and diffuser plenum 360, allows one to very specifically control the size of fine particles 107 which are carried out through Discharge 250 and separated from coarse particles 106. In this manner, material classifier 20 can separate fine particles 107 from coarse particles 106 and is also able to separate or classify very fine particles 107 from coarse particles 106 depending upon the amount of diffuser air 304 allowed to pass through gate valves 362.

Figure 12:
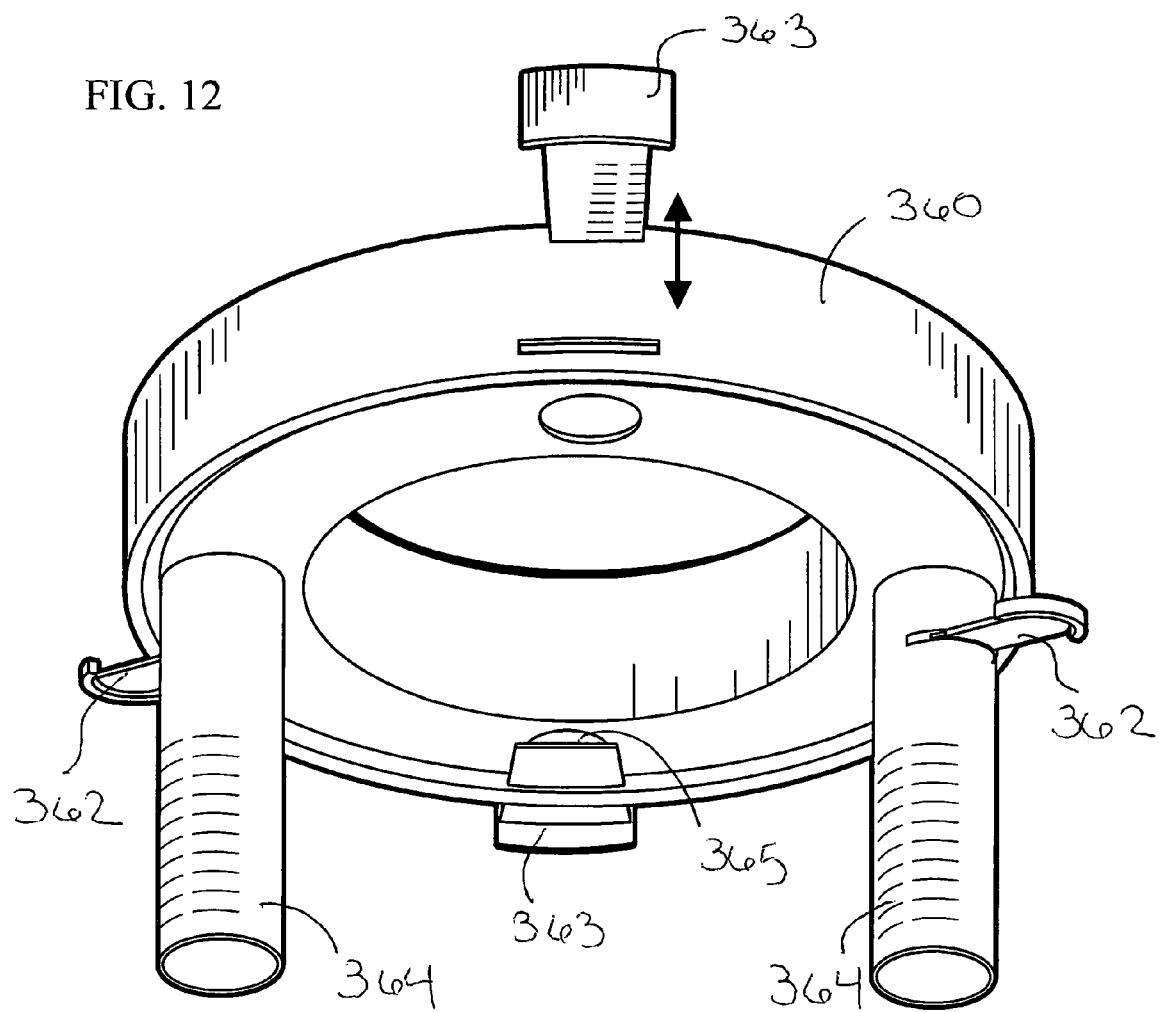
FIG. 12 is a bottom schematic perspective view of the diffuser plenum together with a portion of diffuser air pipes showing the additional plenum diffuser air inlet and plenum gate valve.

Referring now to FIG. 12 which is a bottom perspective view of a portion of the material classifier 20 shown in particular is diffuser plenum 360 together with a portion of diffuser pipe 364, gate valve 362 and the additional components not shown in FIGS. 10 and 11, namely plenum diffuser air inlet 365 and plenum gate valve 363. Preferably, in addition to gate valve 362 mounted in diffuser air pipe 364, additional diffuser air can be admitted into diffuser plenum 360 directly at plenum diffuser air inlets 365 and controlled by plenum gate valve 363. Therefore, diffuser air 304 not only can enter through discharge bottom 367 of discharge pipe 366, but one also has the ability to allow diffuser air 304 to enter directly in through plenum diffuser air inlet 365 to diffuser plenum 360. In practice one may have one or more plenum diffuser air inlets 365 and in drawing FIG. 12 we have shown two, however there may be more or less plenum diffuser air inlets as required for the particular application. In this manner, one is able to control carefully the amount of diffuser air 304 which is entering directly into diffuser plenum 360 through plenum diffuser air inlets 365, versus the diffuser air 304 which enters diffuser plenum 360 from the bottom of discharge pipe bottom 367 and through diffuser air pipe 364 before reaching diffuser plenum 360. In this manner, one can balance the amount of diffuser air being admitted through discharge bottom 367 and directly into diffuser plenum 360.

The balance of material classifier 20, operates in an analogous fashion as per the description of the previous embodiment above.

It should be apparent to persons skilled in the arts that various modifications and adaptation of this structure described above are possible without departure from the spirit of the invention the scope of which defined in the appended claim.

I claim:

1. A material classifier comprising:
   a) a cyclone including a cyclone inlet, a cyclone outlet, a blower and a blower discharge, the cyclone entraining relatively coarse particles in an exterior downwardly spiraling vortex and entraining relatively finer particles in an interior updraft;
   b) an air diffuser connected at a diffuser inlet to said cyclone outlet and at a diffuser outlet to an air lock such that said cyclone and air diffuser are in fluid communication;
   c) wherein said diffuser including a central cylindrical portion including an air inlet means for admitting controlled amounts of diffuser air around substantially the entire cylinder outer periphery of said central cylindrical portion, wherein said diffuser air is admitted into said cyclone in such a manner as to enhance and reinforce the interior updraft such that said material classifier separating fine particles from coarse particles by discharging said fine particles together with air upwardly out said blower discharge, and discharging said coarse particles downwardly through said air lock, such that by varying the amount of diffuser air one controls the size of the fine particles being separated from the coarse particles, and
   d) further including a secondary cleaning unit mounted on an exit side of the air lock wherein, additional fines and diffuser air is communicated from said secondary cleaning unit to said air diffuser.

2. The material classifier claimed in claim 1 wherein said air inlet means including numerous air inlet apertures spaced around said cylinder outer periphery for admitting diffuser air.

3. The material classifier claimed in claim 1 wherein said air inlet means including numerous air slots spaced around said cylinder outer periphery for admitting diffuser air.

4. The material classifier claimed in claim 3 wherein said air slots extending along a longitudinal axis, and said slots oriented at an angle theta measured between said longitudinal axis and vertical such that when diffuser air is admitted through said angled slots said air flow supporting development of an interior updraft in said cyclone.

5. The material classifier claimed in claim 3 wherein said slots are so oriented so as to enhance and reinforce a formation of a strong interior updraft.

6. The material classifier claimed in claim 1 wherein said air inlet means further including a control means for adjustably controlling the amount of diffuser air being admitted through said air inlet means and into said air diffuser.

7. The material classifier claimed in claim 6 wherein said control means including an annular adjustable band extending and clamping around the cylinder outer periphery for selectively covering off all or some of a slot area.

8. The material classifier claimed in claim 6 wherein said control means including a barometric damper for adjusting the amount of diffuser air depending upon the material trough put of the cyclone.

9. The material classifier claimed in claim 1 wherein said central cylindrical portion being larger in diameter than a cyclone outlet diameter.

10. The material classifier claimed in claim 1 wherein said cyclone dimensioned and adapted to promote formation of an exterior downwardly spiralling vortex and an interior updraft.

11. The material classifier claimed in claim 1 wherein said cyclone further including a stand pipe dimensioned to aid and enhance the development of a strong interior updraft.

12. The material classifier claimed in claim 1 wherein the entrained particles being selected from the list including granulates pellets, fibres, flakes, beans, plastic, metal, and paper.

13. The material classifier claimed in claim 1, wherein said secondary cleaning unit including a discharge pipe having a discharge bottom for admitting diffuser air.

14. The material classifier claimed in claim 13 wherein said secondary cleaning unit including at least one diffuser air pipe including a secondary inlet at said discharge pipe for communicating diffuser air and fine particles from said discharge pipe to said air diffuser.

15. The material classifier claimed in claim 14, wherein said air inlet means including at least one valve for controlling the volume of diffuser air communicated from said secondary cleaning unit to said air diffuser.

16. The material classifier claimed in claim 15, wherein said valve including at least one gate valve mounted, in said diffuser air pipe for controlling the volume of diffuser air.

17. The material classifier claimed in claim 16, wherein said discharge pipe having at least one deflector plate for deflecting material discharged from said air lock, such that particles pass by said secondary inlet on their way through said discharge pipe and fine particles are extracted and communicated to said air diffuser.

18. The material classifier claimed in claim 17, wherein the discharge pipe having at least two deflector plates which are mounted in such a manner to provide a cascading effect of particles from an upper deflector plate to a lower deflector plate as they fall through said discharge pipe.

19. The material classifier claimed in claim 18, wherein said air diffuser including a plenum around cylinder outer periphery in fluid communication with air slots in said air diffuser and also in fluid communication with said secondary cleaning unit.

20. The material classifier claimed in claim 1, wherein said air diffuser further including a diffuser plenum extending around cylinder outer periphery for distributing and communicating air into said air diffuser.

21. The material classifier claimed in claim 20, wherein said diffuser plenum having defined therein, at least one plenum diffuser air inlet for communicating diffuser air from the ambience atmosphere into said diffuser plenum, thereby communicating ambient air into said air diffuser.

22. The material classifier claimed in claim 21 wherein said diffuser plenum further including at least one valve for controlling the volume of diffuser air communicated through said plenum diffuser air inlet, thereby allowing one to control the volume of air passing through plenum diffuser air inlet.

23. A material classifier comprising:
 a) a cyclone including a cyclone inlet, a cyclone outlet, a blower and a blower discharge, the cyclone entraining relatively coarse particles in an exterior downwardly spiraling vortex and entraining relatively finer particles in an interior updraft;
 b) an air diffuser connected at a diffuser inlet to said cyclone outlet and at a diffuser outlet to an air lock such that said cyclone and air diffuser are in fluid communication;
 c) wherein said diffuser including a central cylindrical portion including an air inlet means for admitting controlled amounts of diffuser air around substantially the entire cylinder outer periphery of said central cylindrical portion, wherein said diffuser air is admitted into said cyclone in such a manner as to enhance and reinforce the interior updraft such that said material classifier separating fine particles from coarse particles by discharging said fine particles together with air upwardly out said blower discharge, and discharging said coarse particles downwardly through said air lock, such that by varying the amount of diffuser air one controls the size of the fine particles being separated from the coarse particles,
 d) wherein said air inlet means including numerous air slots spaced around said cylinder outer periphery for admitting diffuser air,
 e) wherein said air slots extending along a longitudinal axis and said slots oriented at an angle theta measured between said longitudinal axis and vertical such that when diffuser air is admitted through said angled slots said air flow supporting development of an interior updraft in said cyclone,
 wherein said angle theta is between 10 and 80 degrees.

* * * * *